United States Patent [19]

Anseth et al.

[11] Patent Number: 5,314,673
[45] Date of Patent: May 24, 1994

[54] PROCESS FOR THE CONVERSION OF $N_2O$

[75] Inventors: Kristi Anseth, Williston, N. Dak.; Theodore A. Koch, Wilmington, Del.

[73] Assignee: E. I. Du Pont de Nemours and Company, Wilmington, Del.

[21] Appl. No.: 836,566

[22] Filed: Feb. 18, 1992

[51] Int. Cl.[5] .......................... B01J 8/00; C01B 17/00; C01B 21/00
[52] U.S. Cl. .................................. 423/239.1; 423/351
[58] Field of Search .................. 423/235, 235 D, 351, 423/239, 239 A

[56] References Cited

U.S. PATENT DOCUMENTS 1,845,785  2/1932  Dodge .................................. 423/351
4,877,743  10/1989  Waugh et al. ........................ 423/235

Primary Examiner—Gregory A. Heller

[57] ABSTRACT

A process for the conversion of nitrous oxide ($N_2O$) to nitrogen and oxygen by treating the gas with a catalyst of cobalt oxide and nickel oxide on a zirconia support at a temperature of at least about 280 degrees C.

4 Claims, No Drawings

PROCESS FOR THE CONVERSION OF $N_2O$

FIELD OF THE INVENTION

This invention relates to a process for the conversion of $N_2O$ to nitrogen and oxygen.

BACKGROUND OF THE INVENTION $N_2O$ is a by-product of the nitric acid oxidation of alcohols and ketones, for example in the oxidation of cyclohexanone and cyclohexanol to adipic acid. $N_2O$ is also used as an anesthetic especially in mior surgery such as tooth extraction.

$N_2O$ has recently attacted attention as a possible atmospheric ozone depletion gas, and efforts are therefore under way to diminish the amount of $N_2O$ that is released into the atmosphere.

U.S. Pat. No. 4,259,303 to Nakaji et al. discloses an apparatus for the treatment of $N_2O$ anesthetic waste gas by contacting it with a catalyst comprising one or more of ferric oxide ($Fe_2O_3$), cobalt oxide (CoO), cupric oxide (CuO), chromium oxide ($Cr_2O_3$), manganese dioxide ($MnO_2$), and nickel oxide (NiO).

U.S. Pat. No. 4,793,980 to Torobin discloses the conversion of nitrogen oxides (NOx) to nitrogen and oxygen using finely divided molecular sieve carbon particles. This patent also discloses hollow microsphere catalyst supports that may be made of zirconia, and indicates that hollow microsphere catalyst supports may be used to support various metal oxide catalysts. Among the various alternative metal oxides listed are nickel oxide or cobalt oxide.

SUMMARY OF THE INVENTION

The present invention is a process for the conversion of $N_2O$ to nitrogen and oxygen which comprises contacting the $N_2O$ with a catalyst consisting essentially of nickel oxide and cobalt oxide on a zirconia substrate at a temperature of at least about 280 degrees C. Preferably the ratio of nickel oxide to cobalt oxide in the catalyst is in the range of about 0.5–3/1, and the amount of nickel oxide plus the amount of cobalt oxide in the catalyst is 10 to 80 percent of the total weight of the catalyst. The size and shape of the catalyst substrate will vary, depending on the volume of gas to be treated and the pressure drop. Usually the gas stream containing the $N_2O$ is heated to a temperature above about 280 degrees C. before the gas is contacted with the catalyst.

DETAILED DESCRIPTION OF THE INVENTION

The substrate on which the oxides of nickel and cobalt are maintained is critical. Only zirconia is satisfactory. Other substrates such as alumina are not nearly as effective. Only mixtures of oxides of nickel and cobalt are satisfactory. This catalyst initiates the decomposition of a lower temperature and the catalyst is not deactivated by the exothermic reaction or through more cycles.

The process of the invention will usually be carried out by passing the gas containing the $N_2O$ through a vertically mounted tubular reactor containing the catalyst. The catalyst may be supported on a screen or quartz wool. The tubular reactor normally would be equipped with a heater to bring the catalyst to reaction temperature prior to introducing the $N_2O$-containing gas to the catalyst.

The gas fed to the reactor may be substantially pure $N_2O$ or it may be diluted with other gases.

The flow rate of the gas through the reactor will depend on the temperature of the catalyst, the thickness of the catalyst bed, the amount of $N_2O$ in the gas stream, and the degree of conversion of the $N_2O$ to nitrogen desired. Usually the catalyst temperature (reactor temperature) is maintained above about 325 degrees C. The most complete conversion of $N_2O$ to nitrogen and oxygen is at temperatures of about 400 degrees C.

The catalysts used in the examples (including control examples) were prepared according to the procedures shown below.

Catalyst Prep

A. Control Catalyst of Cobalt Oxide
   Dissolved: 10 gr. cobalt nitrate ($Co[NO_3]_2.6H_2O$) in 20 ml $H_2O$
   Soaked 20 cc $ZrO_2$ pellets having dimensions of about ⅛" in diameter and ⅛" long(zirconia T3/16, Harshaw #803A-4-1-21) in same solution for 2.5 hrs. with occasional stirring.
   Drained off liquid and dried overnight in vacuum oven @ 100° C. (~6 hrs).
   Heated in 1" tube furnace at 700° C. with air flow of 100cc/min for 2 hrs, to convert the cobalt nitrate to cobalt oxide.

B. Control Catalyst of Nickel Oxide
   Dissolved: 10.5 g nickel nitrate ($Ni[NO_3]_2.6H_2O$) in 200 ml/$H_2O$.
   Soaked 20 cc $ZrO_2$ pellets (zironia T 3/16, Harshaw #803A-4-1-21) in same solution for 2.5 hrs with occasional stirring.
   Drained off liquid and dried overnight in vacuum oven @100° C. (~16 hrs).
   Heated in 1- tube furnace at 700° C. with a ir flow of 100 cc/min for 2 hrs, to convert the nickel nitrate to nickel oxide.

C. Catalyst used in the invention
   Dissolved: 5 g cobalt nitrate ($CO[NO_3]_2.6H_2O$) and 5.3 g nickel nitrate ($N1[NO_3]_3.6H_2O$) in 20 ml $H_2O$.
   Soaked 20 cc $ZrO_2$ pellets (zironia T 3/16, Harshaw #803A-4-1-21) in same solution for 2.5 hrs with occasional stirring.
   Drained off liquid and dried overnight in vacuum oven @100° C. (~16 hrs).
   Heated in 1" tube furnace at 700° C. with air flow of 100 cc/min for 2 hrs, to convert the nickel nitrate and the cobalt nitrate to the oxides.

Analysis by x-ray fluoresence gave the following results:

| Sample A | 1.58 wt. % Co |
|----------|---------------|
|          | 180 ppm Ni    |
| Sample B | — Co          |
|          | 1.64 wt. % Ni |
| Sample C | 0.916 wt. % Co |
|          | 0.908 wt. % Ni |

EXAMPLES

A 1 inch tube reactor was charged with 10 cc of the various catalysts shown in the table below. 100 ml per minute of 100% nitrous oxide ($N_2O$) was fed downwardly through the reactor. The temperature settings of the heater (furnace) are shown, and the actual measured temperature of the catalyst is shown under the heading, "Reactor ° C".

In the examples in the table subsequent to "Control 2" the feed was 10% $N_2O$ in helium. The analysis in these examples ignores the helium.

| Example | Coating | Furnace °C. | Reactor °C. | % $N_2 + O_2$ | % $N_2O$ |
|---|---|---|---|---|---|
| 1 | Catalyst C<br>5.0 g Co Nitrate/20 ml<br>5.3 g Ni Nitrate $H_2O$ | 350° C. | 402° C. | 98.5 | 1.5 |
| 2 | Catalyst of Type C<br>2.5 g Ni Nitrate/20 ml<br>7.5 g Co Nitrate $H_2O$ | 350° C. | 369° C. | 93.7 | 4.0 |
| Control 1 | Catalyst A<br>10 g Co Nitrate/20 ml $H_2O$ | 351° C. | 380° C. | 92.3 | 6.8 |
| 3 | Catalyst of Type C<br>7.5 g Ni Nitrate/20 ml<br>2.5 g Co Nitrate $H_2O$ | 351° C. | 373° C. | 92.3 | 6.5 |
| Control 2 | Catalyst B<br>10.5 g Ni Nitrate/20 ml $H_2O$ | 352° C. | 360° C. | 23.8 | 74.4 |
| | (100 ml/min, 10% Nitrous Oxide in helium) | | | | |
| 4 | Catalyst C<br>5.0 g Co Nitrate/20 ml<br>5.3 g Ni Nitrate $H_2O$ | 350° C. | 350° C. | 90.3 | 7.4 |
| 5 | Catalyst of Type C<br>7.5 g Ni Nitrate/20 ml<br>2.5 g Co Nitrate $H_2O$ | 350° C. | 347° C. | 80.3 | 17.0 |
| 6 | Catalyst of Type C<br>2.5 g Ni Nitrate/20 ml<br>7.5 g Co Nitrate $H_2O$ | 351° C. | 349° C. | 76.4 | 21.3 |
| Control 3 | Catalyst A<br>10.0 g Co Nitrate/20 ml $H_2O$ | 351° C. | 346° C. | 61.7 | 34.0 |
| Control 4 | Catalyst B<br>10 g Ni Nitrate/20 ml $H_2O$ | 351° C. | 347° C. | 34.9 | 63.4 |
| 7 | Catalyst C<br>5.0 g Co Nitrate/20 ml<br>5.3 g Ni Nitrate | 201° C.<br>250° C.<br>302° C.<br>350° C. | 191° C.<br>245° C.<br>300° C.<br>350° C. | 23.1<br>32.4<br>64.1<br>90.3 | 73.6<br>64.7<br>32.7<br>7.4 |
| 8 | Catalyst of Type C<br>7.5 g Ni Nitrate/20 ml<br>2.5 g Co Nitrate $H_2O$ | 301° C.<br>351° C.<br>401° C. | 297° C.<br>347° C.<br>397° C. | 46.3<br>79.9<br>95.4 | 51.0<br>16.9<br>1.7 |
| 9 | Catalyst of Type C<br>2.5 g Ni Nitrate/20 ml<br>7.5 g Co Nitrate $H_2O$ | 251° C.<br>301° C.<br>351° C.<br>400° C. | 245° C.<br>296° C.<br>349° C.<br>399° C. | 27.0<br>38.5<br>76.4<br>95.8 | 71.2<br>58.9<br>21.3<br>1.9 |
| Control 5 | Catalyst A<br>10 g Co Nitrate/20 ml $H_2O$ | 251° C.<br>301° C.<br>350° C.<br>401° C. | 243° C.<br>295° C.<br>346° C.<br>398° C. | 22.1<br>30.1<br>61.6<br>91.2 | 72.9<br>65.1<br>34.0<br>4.6 |
| Control 6 | Catalyst B<br>10 g Ni Nitrate/20 ml $H_2O$ | 251° C.<br>301° C.<br>351° C.<br>401° C. | 245° C.<br>297° C.<br>348° C.<br>399° C. | 20.7<br>23.3<br>34.9<br>67.0 | 74.1<br>74.6<br>63.6<br>30.3 |

We claim:

1. A process for the conversion of $N_2O$ to nitrogen and oxygen which comprises contacting the $N_2O$ with a catalyst consisting essentially of nickel oxide and cobalt oxide on a zirconia substrate in which the amount of nickel oxide plus the amount of cobalt oxide in the catalyst is 10 to 80 percent of the total weight of the catalyst at a temperature of at least about 280 degrees C., and producing nitrogen and oxygen.

2. The process of claim 1 in which the ratio of nickel oxide to cobalt oxide in the catalyst is in the range of about 0.5 to 1 to 3 to 1.

3. The process of claim 1 in which the catalyst is in the form of pellet having a particle size of about ⅛ inch in diameter.

4. The process of claim 1 in which the $N_2O$ is heated to a temperature above about 280 degrees C. prior to contacting the catalyst.

* * * * *